United States Patent [19]
Krupick et al.

[11] 3,709,045
[45] Jan. 9, 1973

[54] UNIVERSAL JOINT FLEXURE ASSEMBLY

[75] Inventors: Walter J. Krupick, Succasana; Richard F. Cimera, Fairfield, both of N.J.

[73] Assignee: The Singer Company, Little Falls, N.J.

[22] Filed: Oct. 14, 1971

[21] Appl. No.: 189,110

[52] U.S. Cl. .................................74/5 F, 74/5.4
[51] Int. Cl. ...................................G01c 19/18
[58] Field of Search.........74/5 R, 5 F, 5.41; 308/2 A; 73/66, 468, 469, 470

[56] References Cited

UNITED STATES PATENTS

| | | |
|---|---|---|
| 3,576,133 | 4/1971 | Krupick et al...............................74/5 |
| 3,505,881 | 4/1970 | Varner.........................................74/5 |
| 3,538,776 | 11/1970 | Macor et al. ...............................74/5 F |
| 2,735,305 | 2/1956 | Mathiesen...................................74/5 |
| 3,354,726 | 11/1967 | Krupick et al...........................74/5 F |
| 3,529,477 | 9/1970 | Quermann ...............................74/5 F |

*Primary Examiner*—Manuel A. Antonakas
*Attorney*—S. A. Giarratana et al.

[57] ABSTRACT

A universal joint gyroscope flexure hinge assembly is provided for a free rotor gyroscope, and which interconnects the rotor, or inertial flywheel, of the gyroscope to the motor-driven spin shaft thereof. The flexure hinge assembly of the invention is constructed so that it may be readily adjusted to compensate for spring restraint and unbalances which cause rectified drift errors in the gyroscope.

5 Claims, 5 Drawing Figures

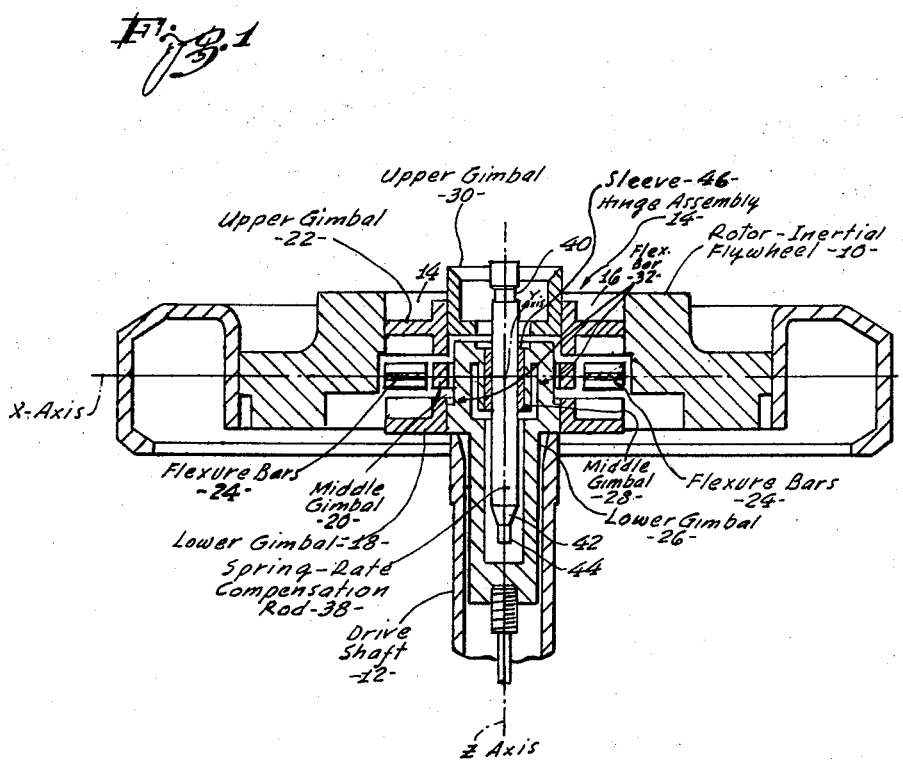
Fig. 1
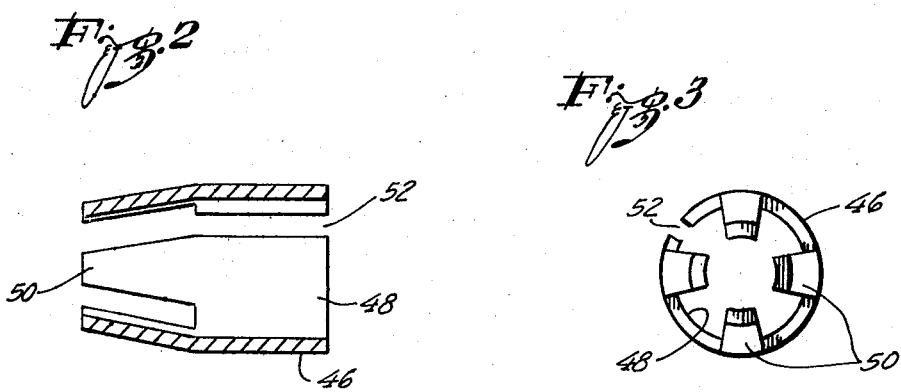
Fig. 2
Fig. 3

UNIVERSAL JOINT FLEXURE ASSEMBLY

BACKGROUND OF THE INVENTION

The present invention is concerned with universal joint gyroscopic flexure hinges of the general type described in U.S. Pat. Nos. 3,527,062; 3,538,776; and 3,354,726, all of which are assigned to the present assignee.

The usual universal flexure hinge of the prior art, and as described in the aforesaid patents, comprises an inner hinge unit and an outer hinge unit, the hinge units being interconnected in a general concentric and parallel manner. Each of the two hinge units of the prior art assemblies is made up of three gimbals, together with two quadrature pairs of appropriately disposed flexure bars which interconnect the three gimbals, and which permit selective tilting of the gimbals about any transverse axis perpendicular to the central axis of the assembly.

The upper gimbals of the two hinge units of the prior art flexure hinge assembly are affixed to one another and to the flywheel of the gyroscope, and the lower gimbals of the two hinge units are connected to one another and to the spin shaft of the gyroscope. The inner hinge unit is constructed to provide axial stiffness along the spin axis of the gyroscope, and the outer hinge unit is constructed to provide the necessary radial and torsional stiffness to the assembly.

A disadvantage inherent in the above-described prior art flexure hinge assemblies is that the prior art hinge assemblies could not be compensated to eliminate rectified torques resulting from angular vibration inputs about its input axis. As a result, a rectified drift-producing torque will occur when angular vibration inputs about the input axis occur at twice gyroscopic flywheel rotation frequency.

The universal joint assembly of the present invention is constructed so that it may incorporate compensation weights on a middle inner gimbal and on a middle outer gimbal, so that these gimbals can be adjusted for inertia and mass unbalance to compensate for spring rate torques and effective gimbal unbalance, and to compensate for the angular vibration rectified drift-producing torque.

BRIEF DESCRIPTION OF THE DRAWINGS

FIG. 1 is a schematic cross-section showing a universal joint flexure hinge which may incorporate the concepts of the invention;

FIGS. 2 and 3 are detailed views of a sleeve member support which is included in the mechanism of FIG. 1;

DETAILED DESCRIPTION OF THE ILLUSTRATED EMBODIMENT

Figure 4:
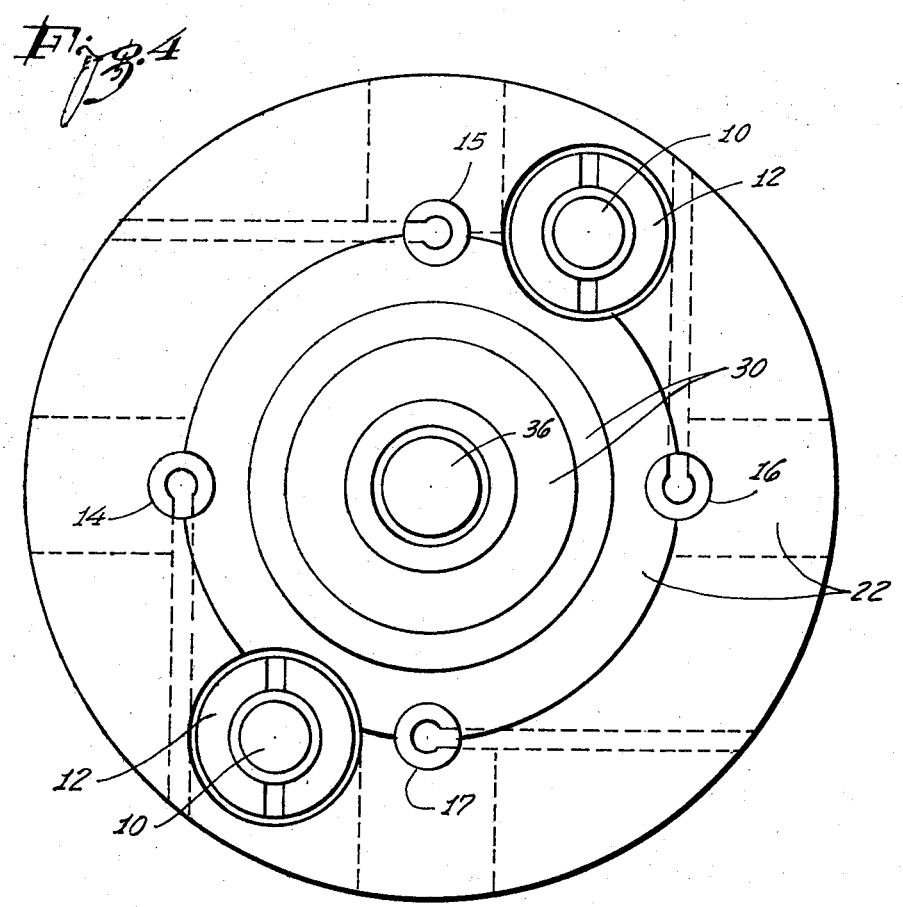
FIG. 4 is a top plan view of the mechanism of FIG. 1, but with the gyro flywheel removed, so as to reveal outer axis compensating weights in place in the assembly.

Referring now to FIG. 1, there is schematically shown in cross-section a portion of a free-rotor flexure-suspended gyroscope similar to that described in U.S. Pat. No. 3,538,776, referred to above. The illustrated gyroscope includes a rotor of inertial flywheel 10, a drive shaft 12, and a flexure hinge assembly which is indicated generally as 14. The flexure hinge assembly serves to interconnect the flywheel 10 and the shaft 12, and it forms a universal joint therebetween.

The other components of the gyroscope, including, for example, the outer casing, the journal bearings for the drive shaft, the drive motor, and the like, have all been omitted for the sake of clarity. These latter components form no part of the present invention, and may be of any known construction.

In the operation of the gyroscope of FIG. 1, rotation is imparted from the shaft 12 through the hinge assembly 14 to the inertial flywheel 10, and this causes the inertial flywheel to spin about the Z axis.

The flexure hinge assembly 14 is also similar to the hinge assembly which is described in some detail in the Krupick et al. U.S. Pat. No. 3,354,726, which likewise is referred to above. The assembly comprises an outer hinge unit which includes a lower gimbal 18, a middle gimbal 20, and an upper gimbal 22. The middle gimbal 20 includes a first pair of diametrically opposed flexure bars 24 which interconnect it with the upper gimbal 22, and a second pair of diametrically opposed flexure bars (not shown) which are in quadrature with the first pair and which serve to interconnect the middle gimbal 20 with the lower gimbal 18.

The flexure hinge assembly of FIG. 1 also includes an inner hinge unit comprising a lower gimbal 26, a middle gimbal 28 and an upper gimbal 30. The lower gimbal 26 is connected to the middle gimbal 28 through a first pair of diametrically opposed flexure bars 32, and the upper gimbal 30 is connected to the middle gimbal 28 through a second pair of diametrically opposed flexure bars (not shown), which are disposed in quadrature with the first pair. The gimbals are positioned relative to one another so that the middle gimbal of the outer hinge will move as the flexure hinge assembly is flexed around one axis, and so that the middle gimbal of the inner hinge will move as the flexure hinge assembly is flexed around the other axis which is at right angles to the first axis.

The lower gimbal 18 of the outer hinge unit is fixedly connected to the lower gimbal 26 of the inner hinge unit, and the upper gimbal 22 of the outer hinge unit is fixedly connected to the upper gimbal 30 of the inner hinge unit. In this way, the upper and lower gimbals in each unit may pivot relative to each other, and respectively about the X axis which is normal to the spin axis Z, and about the Y axis which intersects the spin axis Z and the X axis, and which is normal to the plane of the paper.

In addition, the upper gimbal 22 of the outer hinge unit is affixed to the inertial flywheel 10 of the gyroscope, and the lower gimbal 26 of the inner hinge unit is affixed to the drive shaft 12. With such an arrangement, it will be appreciated that the inner and outer hinge units complement one another and permit the flywheel 10 to pivot relative to the shaft 12 during the rotation thereof about any transverse axis perpendicular to the spin axis Z.

A factor which affects the accuracy of a free rotor gyroscope utilizing the flexure hinge suspension assembly described above is a positive spring restoring force. This force is produced within the flexure elements themselves when the flywheel pivots with respect to the spin shaft. Another factor is a negative spring force which results from inertia forces of the middle gimbal when the flywheel pivots with respect to the spin axis. Yet another factor is the changing unbalance with wheel rotation due to the outer hinge flexures not being in the same plane, or due to the gimbals being unbalanced and to differences in linear stiffness of the hinge assembly to radial and axial acceleration forces.

Compensation of spring rates is achieved by adjusting the inertia of each middle gimbal so that the resultant inertia torques match the spring rate torques for a given flexure axis. In FIG. 1 the resultant inertia spring rate torques due to middle gimbal 20 compensate for the flexure spring rate torques in the X axis, which are due to flexures 24 and 32. The inertia of middle gimbal 28 is compensated so that it compensates for the flexure spring rate torques on the Y axis. Also, the same weights which are used for inertia compensation, by proper positioning, serve to compensate for unbalances due to the outer hinge flexures not being in the same plane.

A compensation for the middle gimbal 28 of the inner hinge is described in the said U.S. Pat. No. 3,538,776, in which a generally cylindrical elongated rod 38 is disposed coaxially within a bore in the middle of the gimbal 28 of the inner hinge unit, as shown in FIG. 1, and this rod serves as a spring rate compensation means. The spring rate compensation rod 38 includes a machined-down neck portion 40 near its upper end to permit easy insertion and removal into and from the middle gimbal 28 by means of a suitable gripping tool. In addition, the extreme lower end of the rod includes a tapered section 42 and an adjacent machined-down terminal section of constant diameter to form a locating pin 44 to further simplify insertion of the rod into the central recess of the middle gimbal 28.

A metallic cylindrical sleeve member 46, as shown in more detail in FIGS. 2 and 3, is provided for supporting the rod 38 and for permitting axial adjustment of the rod. The sleeve member 46 includes a main body portion 48 and a number of equi-distantly annular spaced fingers 50, each one of which is normally axially tapered and bent so as to have its free end extend radially inward, as shown. The sleeve member 46 also incorporates a slot 52, parallel to its axis for permitting the sleeve to contract circumferentially when it is inserted within the middle gimbal 28.

The main body portion 48 of the sleeve member will thus tend to be biased radially outward against the interior surface of the bore of the middle gimbal, and the resulting positive spring force will help maintain the sleeve's position within the middle gimbal, until it can be cemented or otherwise fixed in place. Although the spring force exerted by the flexed fingers 50 of the sleeve member 46 is sufficient to hold the compensating rod 38 stationary during normal operation of the gyroscope, the frictional gripping force is small enough to enable axial positioning of the rod 38 for purposes of compensating spring rate and gimbal unbalance compensation.

Figure 5:
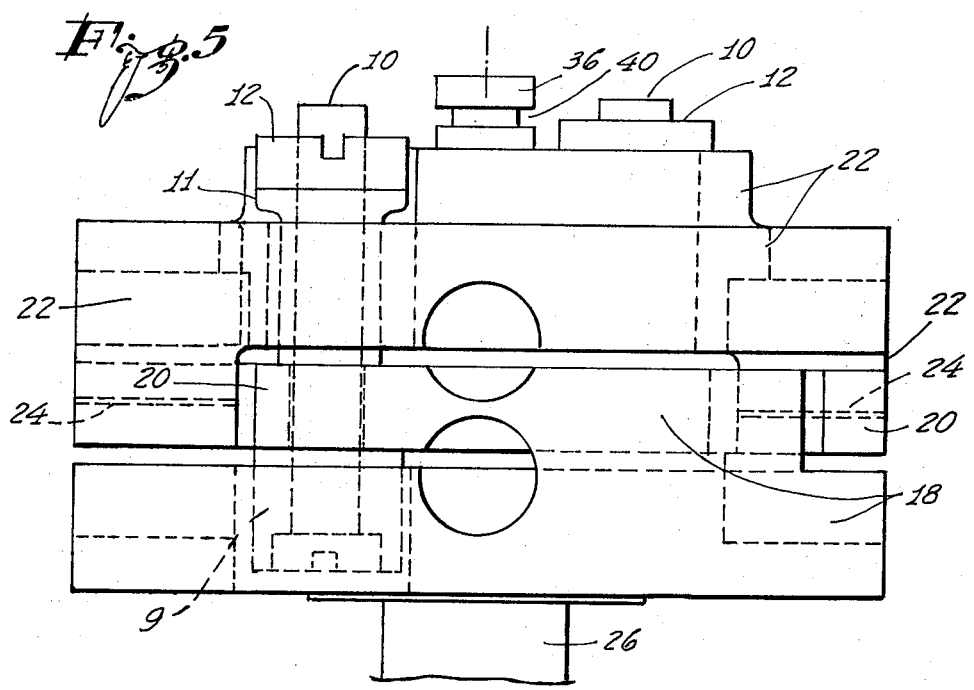
FIG. 5 is a side elevation of the unit of FIG. 4.

Additional compensating weights are also provided, in accordance with the invention, for the middle gimbal 20 of the outer hinged unit, but for purposes of clarity these are not shown in the sectional view of FIG. 1. However, as shown in FIGS. 4 and 5, the outer unit compensating weights are clamped to the middle gimbal 20. Two weight assemblies are shown in FIGS. 4 and 5 for balance. A typical weight assembly, as illustrated, includes a weight 9, a screw 10, a sleeve 11, and a weight 12, all of which are clamped and cemented to the gimbal. These weights are adjusted to achieve the required inertia and balance along the Z axis. Typically, the weight 9 is of a denser material because it is shorter, and the sleeve 11 and weight 12 on the flywheel side are lighter and smaller because they extend further from the gimbal axis in order to be accessible.

Holes 14, 15, 16 and 17 are provided and which extend into the flexure region, for access to allow finishing of the hinge for matching of the radial and axial compliance with the flywheel 10 assembled in position.

In a free rotor gyroscope using a universal joint gimbal assembly, the inertia of the gimbals is adjusted so that at normal operating speed, the inertia restraint torques and flexure restraint torques resulting from motion about the input axis are cancelled. To achieve dynamic tuning at all frequency inputs, a particular set of conditions must be realized which are that the gyroscope be supported by two sets of flexures whose axes are orthogonal so that one middle gimbal moves as a result of motion about one flexure axis, and the other middle gimbal moves as a result of motion about the other flexure axis which is displaced 90° from the first axis, and that each gimbal inertia be adjusted to compensate for flexure restraints as per the following equations:

$$w^2(I_a + I_B) = K_x + K_y \qquad 1$$

$$w^2(I_A \frac{1}{4} - I_B) = K_x - K_y \qquad 2$$

Where: $w$ equals wheel speed; $I_A$ equals the resultant inertia compensation term of the gimbal which is attached to the gyroscope wheel at the X axis, and is equal to the sum of its inertia around each set of flexure axis minus its polar moment inertia; $I_B$ equals the resultant inertia compensation term of the gimbal which is attached to the gyroscope wheel at the "y" axis, and is equal to the sum of its inertia around each set of flexure axis minus its polar moment inertia; $K_x$ equals the sum of the spring restraint of both set of flexures around the "x" axis; and $K_y$ equals the sum of the spring restraints of both sets of flexures around the "y" axis. When the conditions of equations (1) and (2) are achieved, the rectified in phase gyroscope drift errors due to angular displacement, fixed and vibratory, are eliminated.

In addition to the aforesaid inertial adjustment, the inertial weights are positioned so that a balance is obtained in the plane perpendicular to the spin axis; this being required to eliminate gyroscope rectified drift errors due to linear vibrations perpendicular to the spin axis and which occur at twice the gyroscopic flywheel rotation frequency.

In order to achieve matched linear compliances in the radial and axial direction, the outer hinge flexures are arranged to be slightly stiffer than the inner hinge flexures so that they can be finished with the flywheel assembled through access holes, such as holes 14, 15, 16 and 17 in the outer hinge. Matching is required to eliminate gyroscopic anisoelastic drift rectification errors.

A typical calibration could include static measurements of hinge compliance about the "x" and "y" axis, and also the static unbalance in the plane perpendicular to the spin axis. Based on these values, weights are selected to achieve the desired condition of balance and inertia. Final trimming is accomplished by running the gyroscope and making the final calibrations, for input of angular displacements, linear vibrations, and angular and linear vibrations at twice the speed frequency of the gyrscope flywheel.

The invention provides, therefore, an improved universal joint flexure hinge assembly which may be compensated for angular vibration rectification errors. The hinge system of the invention has the minimum part necessary to tune the hinge dynamically for compensation of linear and angular vibration rectification errors. More generally, the invention provides an improved universal joint flexure assembly which can be compensated to eliminate linear and angular vibration rectification errors and angular displacement errors. It will be appreciated that although a particular embodiment of the invention has been shown and described, modifications may be made. It is intended to cover all such modifications which come within the spirit and scope of the invention in the following claims.

What is claimed is:

1. A gyroscope which includes a rotor, a shaft for driving said rotor about a spin axis, and a dual two-axis universal joint multi-flexure unit for interconnecting said rotor to said shaft and comprising inner and outer multi-gimbal hinge assemblies attached to one another so that a middle gimbal of the inner hinge assembly moves with the rotor as the rotor is flexed around a first flexure axis, and so that middle gimbal of the outer hinge assembly moves with the rotor when the rotor is flexed around a second flexure axis displaced ninety degrees from the first flexure axis, the combination of an elongated rod coaxially positioned relative to the spin axis of the middle gimbal of said inner hinge assembly and adjustable along said spin axis to define a moment of inertia of said last-named middle gimbal to compensate dynamically the spring rate torques of flexure which flex when said middle gimbal of said inner hinge assembly moves with said rotor, and said rod being effective to adjust for unbalance around said first flexure axis in a plane perpendicular to said spin axis; and compensation weights mounted on said middle gimbal of said outer hinge assembly to define the moment of inertia of said last-named middle gimbal to compensate dynamically for the spring rate torques of flexure which flex when said middle gimbal of said outer hinge assembly moves with said rotor, said compensation weights being effective to adjust for unbalance around said second flexure axis in a plane perpendicular to said spin axis, the combined compensation of said rod and of said weights dynamically compensating for spring rate torques and eliminating gyroscopic rectified drift errors due to angular vibrations and linear vibrations occurring at twice the rotor speed frequency.

2. The combination defined in claim 1, in which said multi-flexure unit is constructed to exhibit an effective stiffness for linear motions of said rotor in the radial direction which is slightly greater than for linear motions of the rotor in the axial direction, and said outer hinge assembly having access holes therein to permit material to be removed therefrom so as to achieve a match between the effective linear and radial motions of the rotor and linear and radial accelerations thereof so as to eliminate gyroscopic anisoelastic drift rectification errors.

3. The combination defined in claim 1, in which said compensation weights comprise a pair of diametrically opposed compensation weights clamped to a gimbal of said outer hinge assembly.

4. The combination defined in claim 3, in which said diametrically opposed compensation weights includes a first weight clamped to one side of said last-named gimbal, and a second weight clamped to the other side of said gimbal.

5. The combination defined in claim 4, and which includes a sleeve interposed between said second weight and said gimbal.

* * * * *